(12) United States Patent
Fan

(10) Patent No.: US 7,061,887 B2
(45) Date of Patent: Jun. 13, 2006

(54) MULTIPLE MOBILE IP SESSIONS WITH DYNAMICALLY ALLOCATED HOME IP ADDRESS

(75) Inventor: Xiaobo Fan, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 951 days.

(21) Appl. No.: 10/055,040

(22) Filed: Jan. 25, 2002

(65) Prior Publication Data

US 2003/0142650 A1    Jul. 31, 2003

(51) Int. Cl.
*H04Q 7/00* (2006.01)
*H04Q 7/24* (2006.01)
*H04J 3/16* (2006.01)

(52) U.S. Cl. .................. 370/331; 370/472; 370/338

(58) Field of Classification Search ............. 370/328, 370/338, 392, 433, 351, 352, 472; 455/433
See application file for complete search history.

(56) References Cited

U.S. PATENT DOCUMENTS

| | | | | |
|---|---|---|---|---|
| 6,374,108 B1* | 4/2002 | Jakobsen et al. | ........ | 455/432.1 |
| 6,434,134 B1* | 8/2002 | La Porta et al. | ............ | 370/338 |
| 6,445,922 B1* | 9/2002 | Hiller et al. | ................. | 455/433 |
| 6,501,746 B1* | 12/2002 | Leung | ......................... | 370/338 |
| 6,542,491 B1* | 4/2003 | Tari et al. | .................... | 370/338 |
| 6,654,359 B1* | 11/2003 | La Porta et al. | ............ | 370/328 |
| 6,959,341 B1* | 10/2005 | Leung | ........................ | 709/250 |
| 2002/0009066 A1* | 1/2002 | Shimizu et al. | ............. | 370/338 |

OTHER PUBLICATIONS

RFC 2002, Mobility IP Support, Oct. 1996, p. 26-27(registration request message).*

* cited by examiner

*Primary Examiner*—Ricky Q. Ngo
*Assistant Examiner*—Warner Wong
(74) *Attorney, Agent, or Firm*—Sandra Beauchesne, Ericsson Canada Inc.

(57) ABSTRACT

A system, method and node for supporting multiple IP sessions with dynamically allocated home IP addresses in a CDMA2000 network. When the Home Agent (HA) receives a registration request from a Mobile Node (MN), it verifies if there are any mobility bindings for the MN. If yes, the HA verifies if the MN's care-of address equals one it already stores. If not, the HA verifies if the home IP address in the request is zero, and if no refreshes the mobility binding. However, if the IP address is zero, the HA verifies if the MN has reached its session number limit, and if so, the HA keeps only the first session and removes the others, but if no, the HA creates a new mobile IP session. The proper home IP address is the returned to the MN.

22 Claims, 3 Drawing Sheets

MULTIPLE MOBILE IP SESSIONS WITH DYNAMICALLY ALLOCATED HOME IP ADDRESS

BACKGROUND OF THE INVENTION

1. Field of the Invention

The present invention relates generally to mobile IP, and in particular to a support for multiple mobile IP sessions with dynamically allocated home IP addresses.

2. Description of the Related Art

CDMA2000 is a 3G mobile telecommunications standard in which the Packet Core Network (PCN) serves as the cornerstone that provides Internet Protocol (IP) services and mobile IP services to mobile nodes (MNs).

A CDMA2000 network comprises, at least logically, a Home Agent (HA), a Foreign Agent (FA), a Packet Data Serving Node (PDSN), and an Authentication, Authorisation and Accounting Server (AAA). The HA keeps track of the MNs associated with the network, among other things acting like a router when a MN roams in another network, receiving packets intended for the MN and tunnelling them towards the MN, via a FA in the network where the MN is located. The HA also provides mobile IP service to MNs together with a PDSN and the AAA server.

During mobile IP registration, a MN sends a mobile IP registration request to the HA, if necessary forwarded by the FA. The MN may request a dynamically allocated home IP address by setting the home IP address field in the request to zero, i.e. 0.0.0.0 for Internet Protocol (IP) version 4. The HA then dynamically allocates a home IP address for the MN and returns this to the MN in a mobile IP registration response, and the HA also creates a mobility binding that is the home IP address+the IP address of the FA, and the mobility binding is also associated with the Network Access Identifier (NAI) that was provided in the registration request. Thus, under the assumption that a MN only uses one NAI, if a MN has multiple mobility bindings, they are all associated with the same NAI.

During a PDSN to PDSN handoff, a MN sends a mobile IP registration request to update the mobility binding on the HA. If the registration request includes the home IP address, then the mobility binding is updated. This is usually the case as MNs usually remember the dynamically allocated home IP address after PDSN to PDSN handoff.

Some MNs may however forget their home IP address and therefore send a registration request with the home IP address field set to zero. This is not a big problem for present day HAs that only support single mobile IP sessions to MNs, regardless of whether or not the MNs forget the dynamically allocated home IP address at PDSN to PDSN handoff. In this case, if the HA has a mobility binding for the MN, then the HA finds the mobility binding and the previously allocated home IP address, which is returned to the MN in the registration response. If the MN really requests a new dynamically allocated home IP address, i.e. the HA does not have a mobility binding for the MN, then the HA dynamically allocates a new home IP address and returns this to the MN in the registration response.

However, a HA that supports multiple mobile IP sessions for a MN, i.e. a MN may negotiate multiple mobile IP sessions using the same NAI, the HA may encounter a hitherto unsolvable problem. Since one NAI may have multiple mobility bindings associated with it on the HA, how does the HA know what a second registration request with the home IP address field set to zero means? Is it a request for a second mobility binding, or did the MN forget its home IP address during PDSN to PDSN handoff?

It would be advantageous to have a method, a system and a HA that support for multiple mobile IP sessions for a MN, regardless of whether or not it forgets its home IP address during PDSN to PDSN handoff. The present invention provides such a method, system and HA.

SUMMARY OF THE INVENTION

In one aspect, the present invention is a method for supporting multiple mobile IP sessions with dynamically allocated home IP addresses in a CDMA2000 network. A Home Agent (HA) receives a registration request ultimately sent from a Mobile Node (MN), the request comprising a care-of address (COA) and a home IP address. The HA then verifies if any mobility bindings exist for the MN; if yes, the HA verifies if the COA from the registration request is equal to the COA from the latest registration request from the MN, and if this is not the case, the HA verifies if the home IP address in the registration request is zero. If the home IP address is equal to zero, the HA verifies if the MN has reached its session number limit. If this is not the case, the HA creates a new mobile IP session for the MN, but if the session limit is reached, then the HA retrieves the home IP address associated with the first mobility binding for the MN, and removes any other mobility binding for the MN. The HA finally returns a registration response.

In another aspect, the present invention is a system for supporting multiple mobile IP sessions with dynamically allocated home IP addresses in a CDMA2000 network. The system comprises a Home Agent (HA) that receives a registration request ultimately sent from a Mobile Node (MN), the request comprising a care-of address (COA) and a home IP address. The HA then verifies if any mobility bindings exist for the MN; if yes, the HA verifies if the COA from the registration request is equal to the COA from the latest registration request from the MN, and if this is not the case, the HA verifies if the home IP address in the registration request is zero. If the home IP address is equal to zero, the HA verifies if the MN has reached its session number limit. If this is not the case, the HA creates a new mobile IP session for the MN, but if the session limit is reached, then the HA retrieves the home IP address associated with the first mobility binding for the MN, and removes any other mobility binding for the MN. The HA finally returns a registration response.

In yet another aspect, the present invention is a Home Agent (HA) comprising an Input/Output unit (I/O) and a processing unit. I/O receives a registration request ultimately sent from a Mobile Node (MN), the request comprising a care-of address (COA) and a home IP address, and forwards the relevant data to the processing unit. The processing unit then verifies if any mobility bindings exist for the MN; if yes, the processing unit verifies if the COA from the registration request is equal to the COA from the latest registration request from the MN, and if this is not the case, the processing unit verifies if the home IP address in the registration request is zero. If the home IP address is equal to zero, the processing unit verifies if the MN has reached its session number limit. If this is not the case, the processing unit creates a new mobile IP session for the MN, but if the session limit is reached, then the processing unit retrieves the home IP address associated with the first mobility binding for the MN, and removes any other mobility binding for the MN. The I/O finally receives relevant data from the processing unit and returns a registration response.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
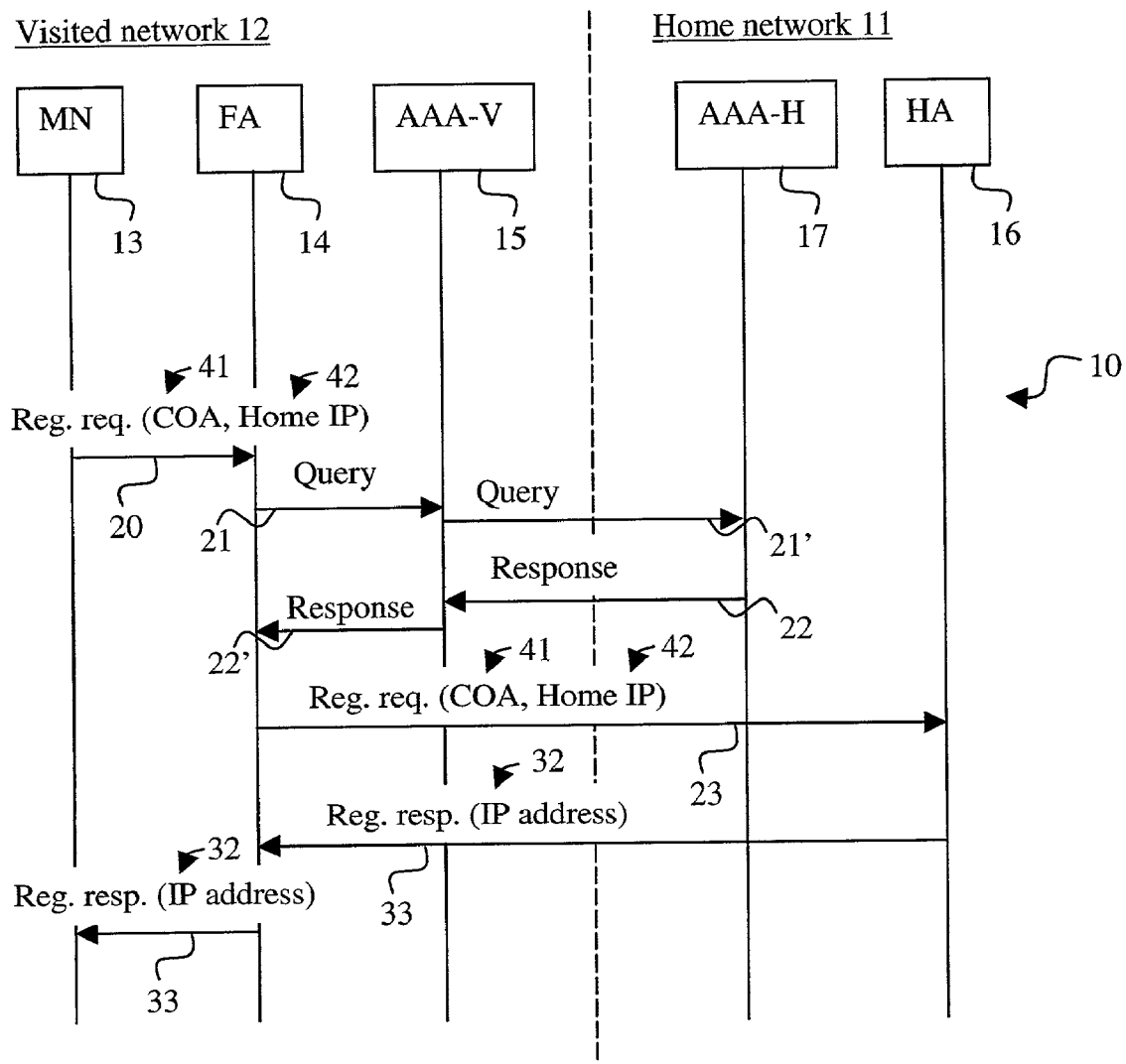
FIG. 1 is a signal flow chart illustrating mobile IP registration according to a preferred embodiment of the invention.

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

Figure 2:
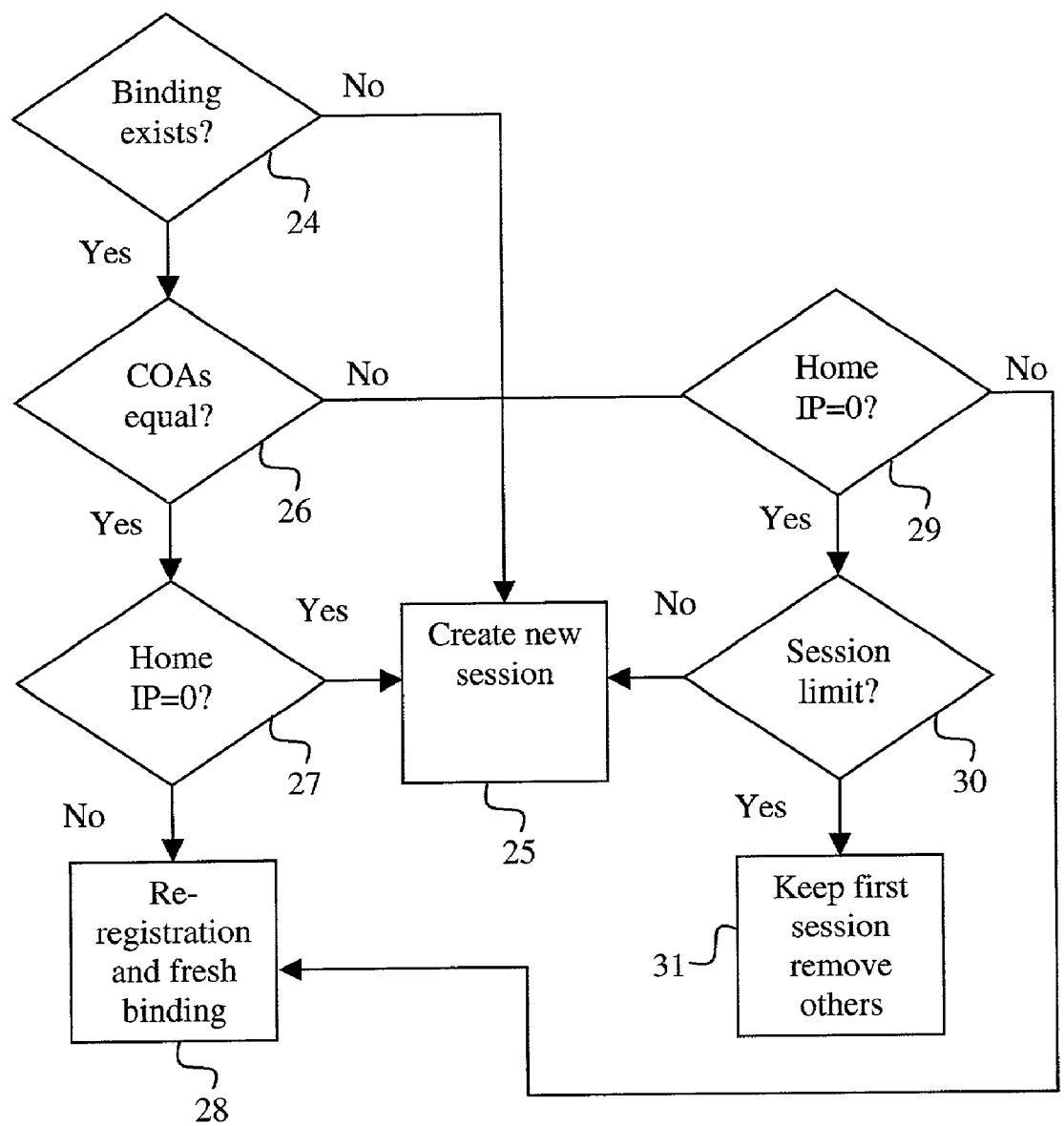
FIG. 2 is a method flowchart illustrating mobile IP registration according to a preferred embodiment of the invention.

Referring now to FIG. 1 and FIG. 2, respectively depicting a signal flow chart and a method flowchart illustrating mobile IP registration according to a preferred embodiment of the invention. FIG. 1 shows a network environment 10 comprising a home network 11 and a visited network (also called roaming network) 12. The home network 11 comprises a Home Agent (HA) 16, and the visited network 12 comprises a Foreign Agent (FA) 14, a Home Authentication, Authorisation and Accounting Server (AAA-H) 17, and a Visited Authentication, Authorisation and Accounting Server (AAA-V) 15. A Mobile Node (MN) 13, whose home network is the home network 11, roams within the visited network 12.

While the HA 16 is aware of the limit of the number of sessions for the MN 13, a limit that may be different for different MNs, the AAA-H 17 controls the limit.

The method starts when the MN 13 sends to the FA 14 a registration request 20 comprising the IP address of the FA 14 as its care-of address (COA) 41 and a home IP address 42. Upon reception, the FA 14 sends a message 21 to the AAA-V 15 that proxies it as message 21' to the AAA-H 17, in order to verify if the AAA-H 17 approves the registration request 20 for MN 13. The AAA-H 17 responds in message 22, which is proxied by the AAA-V 15 as message 22', and if the response is positive, the FA 14 forwards the registration request 20 to the proper HA 16 as registration request 23.

When the HA 16 receives the registration request 23 it verifies if there are any mobility bindings for the Network Access Identifier (NAI) associated with the MN 13, step 24. If there are no mobility bindings, the HA 16 dynamically allocates a new home IP address for the session and creates a new mobility binding for the NAI, step 25. The new home IP 32 address is then returned to the MN 13 in a mobile IP registration response 33.

If it is determined during step 24 that at least one mobility binding exists for the NAI, the HA then determines if the COA 41 in the registration request 23 is the same as the COA associated with the latest mobility binding, step 26.

If the COAs are identical, then the MN 13 has not performed a PDSN to PDSN handoff. The HA 16 then verifies if the home IP address 42 in the registration request 23 is zero, step 27. If so, it means that the MN 13 requests a new mobile IP session and the HA 16 proceeds with step 25, in which the HA 16 dynamically allocates a new home IP address for the session and creates a new mobility binding for the NAI. The new home IP 32 address is then returned to the MN 13 in a mobile IP registration response 33.

If the COAs are identical and the home IP address 42 is not zero, it means that the MN 13 performs a mobile IP re-registration, in which case the HA 16 finds the mobility binding corresponding to the IP address 42 and refreshes the mobility binding, step 28.

If, however, it is determined during step 26, that the COA 41 in the registration request 23 is not the same as the COA associated with the latest mobility binding, it means that the MN 13 has performed a PDSN to PDSN handoff. The HA then verifies if the home IP address 42 in the registration request 23 is zero, step 29. If the home IP address 42 is not zero, but equal to the home IP address previously allocated to the MN 13, then the MN 13 performs a mobile IP re-registration during PDSN to PDSN handoff, and the HA 16 finds the mobility binding for this IP address 42 (NOT THE NAI?) and refreshes this mobility binding, step 28.

If, however, the home IP address 42 is zero, the HA 16 verifies if the MN 13 has reached its mobile IP session number limit, step 30. If the MN 13 has not reached this limit, then the HA proceeds with step 25 and dynamically allocates a new home IP address for the session and creates a new mobility binding for the NAI.

On the other hand, if the MN 13 has reached its mobile IP session number limit, it means that the MN 13 forgets its home IP address at PDSN to PDSN handoff. This is because the FA 14 verifies with the AAA-H 17 before forwarding the registration request 23 to the HA 16. If the AAA-H 17 detects that the MN 13 has reached its limit, then the AAA-H 17 rejects the registration request and, as a result, the FA 14 rejects the registration request 20. Since the HA 16 knows that the MN 13 forgets its home IP address it proceeds with step 31 in which it accepts the registration request 23, finds the home IP address associated with the first mobility binding, and removes any other mobility bindings associated with the MN 13.

In all the cases above, if the HA 16 accepts the registration request 23, it returns a mobile IP registration response 33 to the MN 13, possibly comprising a new home IP address 32.

Figure 3:
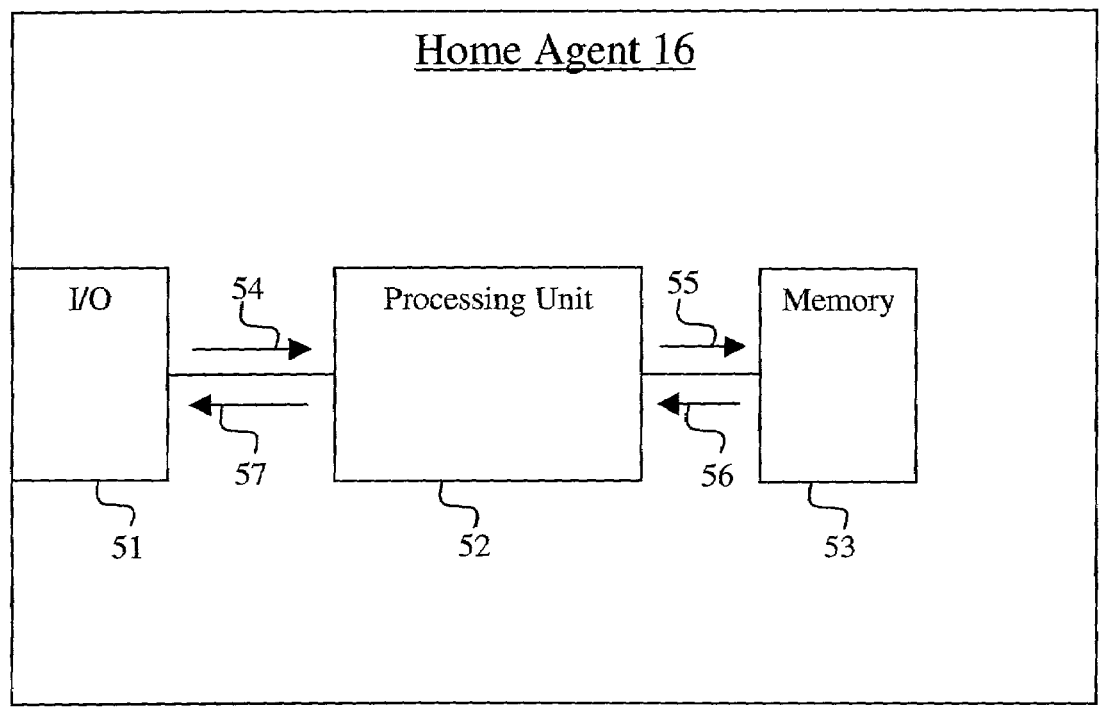
FIG. 3 is a block chart of a Home Agent according to a preferred embodiment of the invention.

FIG. 3 is a simplified block chart illustrating a Home Agent (HA) 16 according to a preferred embodiment of the invention. The HA 16 comprises an Input/Output Unit (I/O) 51, a Processing Unit 52, and a memory 53. When performing the method described hereinbefore (see FIGS. 1 and 2), the HA 16 receives the registration request 23 at the I/O 51 and forwards the relevant information 54 to the processing unit 52. The processing unit 52 the performs the appropriate steps of the method as described in FIG. 2—i.e. two or more of steps 24-31—and, when needed, requests data 55 from the memory 53 that returns the requested data 56. The processing unit 52 then sends the relevant data 57 to the I/O 51 that sends the registration response 33.

Although the system and method of the present invention have been described in particular reference to certain radio telecommunications messaging standards, it should be realized upon reference hereto that the innovative teachings contained herein are not necessarily limited thereto and may be implemented advantageously with any applicable radio telecommunications standard. It is believed that the operation and construction of the present invention will be apparent from the foregoing description. The method and system shown and described have are provided as exemplary embodiments of the invention, it will be readily apparent that various changes and modifications could be made therein without departing from the scope of the invention as defined by the claims set forth hereinafter. For example, while the invention has been described in a CDMA2000 network, it is understood that it may be applied with other kinds of networks.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for supporting muitiple mobile IP sessions with dynamically allocated home IP addresses in a network, the method comprising at a Home Agent (HA) the steps of:
   receiving a registration request ultimately sent from a Mobile Node (MN), the request comprising a care-of address (COA) and a home IF address;
   verifying if any mobility bindings exist for the MN;
   if yes, verifying if the COA from the registration request is equal to the COA from the latest registration request from the MN;
   if no, verifying if the home IP address in the registration request is zero;
   if yes, verifying if the MN has reached its session number limit;
   if no:
      creating a new mobile IP session for the MN; and
   if yes:
      retrieving the home IF address associated with a first mobility binding for the MN;
      removing any other mobility binding for the MN; and
      returning a registration response.

2. The method of claim 1, wherein the step of creating a new session further comprises the steps of:
   allocating dynamically a home IP address for the MN; and
   creating a mobility binding for the MN.

3. The method of daim 1, further comprising, if the home IP address in the registration request is not zero, the step of:
   refreshing the first mobility binding.

4. The method of claim 1, further comprising, if no mobility bindings exist, the step of:
   creating a new mobile IP session for the MN comprising:
   allocating dynamically a home IP address for the MN; and
   creating a mobility binding for the MN.

5. The method of claim 1, further comprising, if the COA from the registration request is equal to the COA from the latest registration request from the MN, the steps of:
   verifying if the home IP address in the registration request is zero; and
   if yes, creating a new mobile IP session for the MN comprising:
      allocating dynamically a home IP address for the MN; and
      creating a mobility binding for the MN; and
   if no, refreshing the first mobility binding for the MN.

6. The method of claim 1, wherein the registration request is forwarded to the HA by a Foreign Agent (FA).

7. The method of claim 6, further comprising, prior to forwarding by the FA the registration request to the HA, the steps of:
   sending by the FA a message to an Authentication, Authorisation and Accounting Server (AAA) to verify if the AAA approves the registration request; and
   receiving by the FA a response from the AAA.

8. The method of claim 7, wherein the step of forwarding by the FA the registration request to the HA is only performed upon reception of a positive response from the AAA.

9. A system for supporting multiple mobile IP sessions with dynamically allocated home IP addresses in a network, the system comprising a Home Agent (HA), wherein the HA:
   receives a registration request ultimately sent from a Mobile Node (MN), the request comprising a care-of address (COA) and a home IP address;
   verifies if any mobility bindings exist for the MN;
   if yes, verifies if the COA from the registration request is equal to the COA from the latest registration request from the MN;
   if no, verifies if the home IP address in the registration request is zero;
   if yes, verifies if the MN has reached its session number limit;
   if no:
      creates a new mobile IP session for the MN; and
   if yes:
      retrieves the home IP address associated with the a first mobility binding for the MN;
      removes any other mobility binding for the MN; and
      returns a regIstration response.

10. The system of claim 9, wherein the HA to create a new session:
   allocates dynamically a home IP address for the MN; and
   creates a mobility binding for the MN.

11. The system of claim 9, wherein, if the home IP address in the registration request is not zero, the HA further:
   refreshes the first mobility binding.

12. The system of claim 9, wherein, if no mobility bindings exist, the HA further:
   creates a new mobile IP session for the MN, to what end it:
   allocates dynamically a home IP address for the MN; and
   creates a mobility binding for the MN.

13. The system of claim 9, wherein, if the COA from the registration request is equal to the COA from the latest registration request from the MN, the HA further:
   verifies if the home IP address in the registration request is zero; and
   if yes, creates a new mobile IP session for the MN, to what end it:
      allocates dynamically a home IP address for the MN; and
      creates a mobility binding for the MN; and
   if no, refreshes the first mobility binding for the MN.

14. The system of claim 9, further comprising a Foreign Agent (FA) that forwards the registration request to the HA.

15. The system of claim 14, further comprising an Authentication, Authorisation and Accounting Server (AAA), and wherein, prior to forwarding by the FA the registration request to the HA, the FA further:
   sends a message to the AAA to verify if the AAA approves the registration request; and
   receives a response from the AAA.

16. The system of claim 15, wherein the FA only forwards the registration request to the HA upon reception of a positive response from the AAA.

17. A Home Agent (HA) for supporting multiple mobile IP sessions with dynamically allocated home IP addresses in a network, the HA comprising
an Input/Output unit and a processing unit, wherein:
the Input/Output unit:
receives a registration request ultimately sent from a Mobile Node (MN), the request comprising a care-of address (COA) and a home IP address; and
sends relevant data from the registration request to the processing unit;
receives data for a registration response from the processing unit; and
returns the registration response; and
the processing unit:
verifies if any mobility bindings exist for the MN;
if yes, verifies if the COA from the registration request is equal to the COA from the latest registration request from the MN;
if no, verifies if the home IP address in the registration request is zero;
if yes, verifies if the MN has reached its session number limit;
if no:
creates a new mobile IP session for the MN; and
if yes:
retrieves the home IP address associated with a first mobility binding for the MN; and
removes any other mobility binding for the MN.

18. The Home Agent (HA) of claim 17, wherein the processing unit to create a new session:
allocates dynamically a home IP address for the MN; and
creates a mobility binding for the MN.

19. The Home Agent (HA) of claim 17, wherein, if the home IP address in the registration request is not zero, the processing unit further:
refreshes the first mobility binding.

20. The Home Agent (HA) of claim 17, wherein, if no mobility bindings exist, the processing unit further:
creates a new mobile IP session for the MN, to what end it:
allocates dynamically a home IP address for the MN; and
creates a mobility binding for the MN.

21. The Home Agent (HA) of claim 17, wherein, if the COA from the registration request is equal to the COA from the latest registration request from the MN, the processing unit further:
verifies if the home IP address in the registration request is zero; and
if yes, creates a new mobile IP session for the MN, to what end it:
allocates dynamically a home IP address for the MN; and
creates a mobility binding for the MN; and
if no, refreshes the first mobility binding for the MN.

22. The Home Agent (HA) of claim 17, further comprising a memory that:
receives requests for data from the processing unit; and
returns the requested data to the processing unit.

* * * * *

UNITED STATES PATENT AND TRADEMARK OFFICE
CERTIFICATE OF CORRECTION

PATENT NO. : 7,061,887 B2  Page 1 of 1
APPLICATION NO. : 10/055040
DATED : June 13, 2006
INVENTOR(S) : Xiaobo Fan It is certified that error appears in the above-identified patent and that said Letters Patent is hereby corrected as shown below:

In Column 5, Line 22, in Claim 1, delete "muitiple" and insert -- multiple --, therefor.

In Column 5, Line 27, in Claim 1, delete "IF" and insert -- IP --, therefor.

In Column 5, Line 40, in Claim 1, delete "IF" and insert -- IP --, therefor.

In Column 5, Line 49, in Claim 3, delete "daim" and insert -- claim --, therefor.

In Column 6, Line 34, in Claim 9, delete "regIstration" and insert -- registration --, therefor.

Signed and Sealed this

Twenty-seventh Day of May, 2008

JON W. DUDAS
*Director of the United States Patent and Trademark Office*